United States Patent
Parthasarathy et al.

(10) Patent No.: US 7,290,081 B2
(45) Date of Patent: Oct. 30, 2007

(54) APPARATUS AND METHOD FOR IMPLEMENTING A ROM PATCH USING A LOCKABLE CACHE

(75) Inventors: Sivagnanam Parthasarathy, Carlsbad, CA (US); Alessandro Risso, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/146,537

(22) Filed: May 14, 2002

(65) Prior Publication Data

US 2003/0217227 A1 Nov. 20, 2003

(51) Int. Cl.
G06F 12/00 (2006.01)

(52) U.S. Cl. .................. 711/102; 711/103; 711/118; 711/128; 711/133; 711/134; 711/136; 711/144; 711/145; 711/152; 711/165; 713/1; 713/2; 713/100; 712/208; 712/209; 712/211; 712/213

(58) Field of Classification Search ........ 711/102–103, 711/165, 215; 712/211; 714/8; 717/111, 717/168, 169
See application file for complete search history.

(56) References Cited

U.S. PATENT DOCUMENTS

| | | | |
|---|---|---|---|
| 4,866,665 A * | 9/1989 | Haswell-Smith | 714/35 |
| 5,481,713 A * | 1/1996 | Wetmore et al. | 717/170 |
| 5,757,690 A | 5/1998 | McMahon | 365/104 |
| 5,796,974 A * | 8/1998 | Goddard et al. | 712/211 |
| 5,802,549 A | 9/1998 | Goyal et al. | |
| 5,829,012 A * | 10/1998 | Marlan et al. | 711/102 |
| 5,835,778 A | 11/1998 | Yoshihara | |
| 5,901,225 A * | 5/1999 | Ireton et al. | 714/7 |
| 5,950,012 A * | 9/1999 | Shiell et al. | 717/169 |
| 6,076,134 A | 6/2000 | Hagae | |
| 6,122,731 A * | 9/2000 | Son | 713/1 |
| 6,135,651 A * | 10/2000 | Leinfelder et al. | 717/168 |
| 6,141,740 A * | 10/2000 | Mahalingaiah et al. | 711/215 |
| 6,182,208 B1 * | 1/2001 | Peri et al. | 712/227 |
| 6,260,157 B1 * | 7/2001 | Schurecht et al. | 714/8 |
| 6,279,077 B1 * | 8/2001 | Nasserbakht et al. | 711/118 |
| 2002/0120810 A1 * | 8/2002 | Brouwer | 711/103 |
| 2003/0101431 A1 * | 5/2003 | Duesterwald et al. | 717/111 |

* cited by examiner

*Primary Examiner*—Sanjiv Shah
*Assistant Examiner*—Zhuo H. Li
(74) *Attorney, Agent, or Firm*—Lisa K. Jorgenson; William A. Munck

(57) ABSTRACT

A ROM patching apparatus for use in a data processing system that executes instruction code stored in the ROM. The ROM patching apparatus comprises: 1) a patch buffer for storing a first replacement cache line containing a first new instruction suitable for replacing at least a portion of the code in the ROM; 2) a lockable cache; 3) core processor logic operable to read from an associated memory a patch table containing a first table entry, the first table entry containing 1) the first new instruction and 2) a first patch address identifying a first patched ROM address of the at least a portion of the code in the ROM. The core processor logic loads the first new instruction from the patch table into the patch buffer, stores the first replacement cache line from the patch buffer into the lockable cache, and locks the first replacement cache line into the lockable cache.

23 Claims, 2 Drawing Sheets

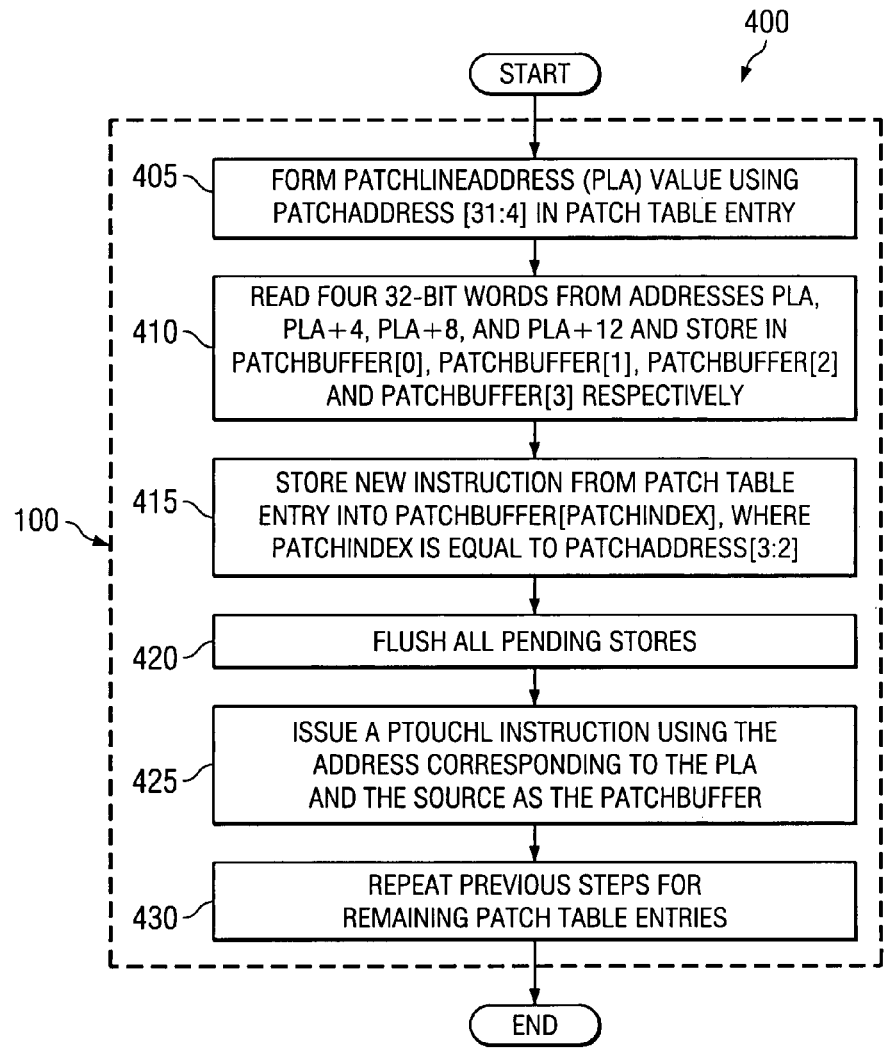

APPARATUS AND METHOD FOR IMPLEMENTING A ROM PATCH USING A LOCKABLE CACHE

TECHNICAL FIELD OF THE INVENTION

The present invention is generally directed to data processors and, more specifically, to an apparatus for patching a read-only memory (ROM) in a data processor.

BACKGROUND OF THE INVENTION

Large processing systems that contain one or more microprocessors or micro-controllers use a read-only memory (ROM) to store programs and tables and a read-write memory, such as random access memory (RAM), Flash memory, or the like. Frequently, the program in the ROM must be updated with patched code to fix bugs or to enhance functionality. This is problematic because the code in the ROM cannot be modified.

A number of solutions have been proposed to address this problem. Conventional ROM code patching apparatuses have been based on the principle of storing the patched code in the read-write memory and implementing a technique to deliver the patched code from the read-write memory whenever the patched code address is referenced. U.S. Pat. No. 6,260,157 to Schurecht et al. and U.S. Pat. No. 5,757,690 to McMahon discuss techniques for accomplishing this.

One technique is based on the use of a content addressable memory (CAM). A CAM has several entries and each entry holds the following information:

a) The ROM address that is to be patched; and b) The corresponding RAM address that holds the patched code.

This approach is hardware intensive and is not power efficient. Also, the size of the CAM limits the number of ROM addresses that can be patched.

In another technique, the program executes a function by using a table to discover the entry-point of the function. The tables are initially stored in ROM and are subsequently copied to the read-write memory before the functions are invoked. With this technique, it is possible to patch the read-write and use the patched code in the read-write memory. However, this method is not generic enough, requires duplication, and makes it difficult to write the functions. It is, therefore, quite impractical.

Additionally, software breakpoints are special instructions that are inserted by a debugger program to enable debugging of an application. When the user deletes the breakpoint, the debugger replaces the software breakpoint instruction with the original instruction.

In the case of a data processor with a program cache, the sequence for inserting a data breakpoint is as follows:

1) Perform a PINV<breakpoint-address>. This instruction invalidates the breakpoint line from the cache.

2) Save the original instruction at the breakpoint-address in the local heap of the debugger.

3) Replace the original instruction with the software breakpoint instruction.

The sequence for removing a data breakpoint is as follows:

1) Perform a PINV<breakpoint-address>. This instruction invalidates the breakpoint line from the cache.

2) Restore the instruction at the breakpoint-address with the original instruction from the local heap of the debugger.

The above sequence does not work in the case of the breakpoint-address belonging to the ROM address space. This is because one cannot store into the ROM space. An additional challenge arises when the breakpoint-address is a part of the ROM patch address list. In this case the patched instruction has to be restored instead of the original instruction that was part of the ROM.

Therefore, there is a need in the art for improved apparatuses and methods for efficiently performing ROM patching in a data processing system. In particular, there is a need for apparatuses and methods for efficiently performing ROM patching that do not adversely affect the operation of software breakpoints used by debugger programs.

SUMMARY OF THE INVENTION

To address the above-discussed deficiencies of the prior art, it is a primary object of the present invention to provide, for use in a data processing system capable of executing instruction code in a read-only memory (ROM), a ROM patching apparatus for patching code in the ROM. According to an advantageous embodiment of the present invention, the ROM patching apparatus comprises: 1) a patch buffer capable of storing a first replacement cache line containing a first new instruction suitable for replacing at least a portion of the code in the ROM; 2) a lockable cache; 3) core processor logic operable to read from an associated memory a patch table containing a first table entry, the first table entry containing 1) the first new instruction and 2) a first patch address identifying a first patched ROM address of the at least a portion of the code in the ROM, wherein the core processor logic is operable to load the first new instruction from the patch table into the patch buffer, to store the first replacement cache line from the patch buffer into the lockable cache, and to lock the first replacement cache line into the lockable cache.

According to one embodiment of the present invention, a subsequent access to the first patched ROM address accesses the first replacement cache line in the lockable cache.

According to another embodiment of the present invention, the core processor logic stores the first replacement cache line from the patch buffer into the lockable cache line using a special purpose pre-fetch instruction.

According to still another embodiment of the present invention, the special purpose pre-fetch instruction performs a line fill of the lockable cache using the first replacement cache line in the patch buffer as a data source.

According to yet another embodiment of the present invention, the special purpose pre-fetch instruction stores the first replacement cache line as a locked line in the lockable cache.

According to a further embodiment of the present invention, tag information associated with the first replacement cache line in the lockable cache is derived from the first patch address.

According to a yet further embodiment of the present invention, the associated memory is a Flash coupled to the data processing system.

According to a still further embodiment of the present invention, the patch table contains a second table entry containing 1) a second new instruction and 2) a second patch address identifying a second patched ROM address of the at least a portion of the code in the ROM, wherein the core processor logic is operable to load a second new instruction from the patch table into the patch buffer, to store a second replacement cache line from the patch buffer into the lockable cache, and to lock the second replacement cache line into the lockable cache.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 3 illustrates a patch table used by a ROM patching apparatus according to one embodiment of the present invention; and FIG. 4 is a flow diagram illustrating the operation of the exemplary ROM patching apparatus according to one embodiment of the present invention.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
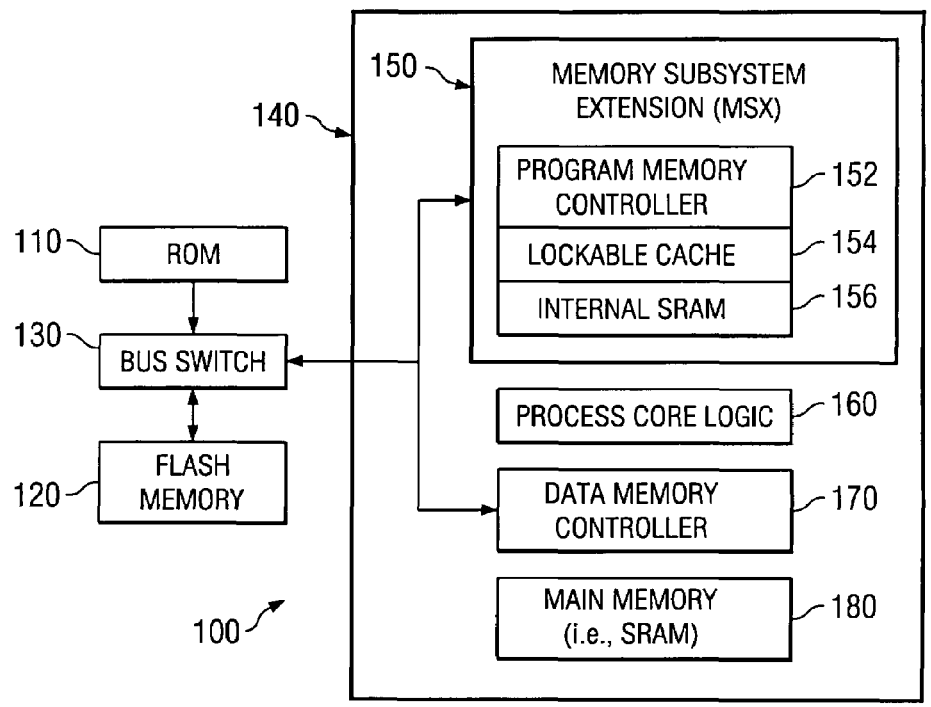
FIG. 1 illustrates selected portions of an exemplary processing system, which implements a ROM patching apparatus according to the principles of the present invention.

FIG. 1 illustrates selected portions of exemplary processing system 100, which implements a ROM patching apparatus according to the principles of the present invention. Processing system 100 comprises read-only memory (ROM) 110, Flash memory 120, bus switch 130, and data processor 140. Data processor 140 comprises memory subsystem extension (MSX) 150, processor core logic 160, data memory controller 170, and main memory 180. Memory subsystem extension (MSX) 150 comprises program memory controller (PMC) 152, lockable program (i.e., instruction) cache 154, and internal static random access memory (SRAM) 156.

Program memory controller (PMC) 152 accepts requests from processor core logic 160 to fetch instruction code and execute special instructions discussed below in greater detail. In addition, PMC 152 incorporates a cache controller. PMC 152 supports lockable program cache 154, which is a 4-way set associative cache with support for locked cache lines according to an advantageous embodiment of the present invention. Normally, the cache controller portion of PMC 152 uses a Least Recently Used (LRU) eviction policy to determine the cache-way to evict. However, in accordance with the principles of the present invention, PMC 152 uses a modified LRU policy that excludes locked cache lines from being candidates for eviction. This feature is available in data processor 140 to provide predictable code fetch for performance sensitive (i.e., time sensitive) code sequences.

Data processor 140 executes a PTOUCH instruction that pre-fetches a line to lockable program cache 154 from main memory, ROM, flash memory, or other data source, and executes a PTOUCHL instruction that optionally locks the line in lockable program cache 154. According to the principles of the present invention, the capability of locking a cache line is used, along with some additional logic, to implement a ROM patch.

The additional logic to implement a ROM patch to MSX 150 includes:

1. A specific line-fill buffer, occasionally referred to hereafter as the "patch buffer". This is typically equal to the line size of the cache (e.g., 128 bits).

2. A specific mechanism to address and selectively write to the patch buffer (or line fill buffer).

3. A specific mechanism to perform a line-fill of lockable program cache 154 and lock the line using the patch buffer as the data source. Normally, the data source is either off-chip memory (e.g., RAM, ROM, Flash) or on-chip SRAM.

With the above mentioned support, the ROM patch sequence is as shown below:

1. The patch-address that indicates the line to be patched is read from ROM 110 and stored into the patch buffer.

2. Using the patch information stored in the RAM or other media, the patch buffer is updated to reflect the change. This normally involves replacing the specific instruction in the patch buffer by a branch to the patched code residing in the RAM.

3. Thereafter, a PTOUCHLP<patch-address> (Pre-fetch and lock from the patch buffer) instruction is issued from processor core logic 160 to MSX 150 to read the patch buffer and store it as a locked line in the cache with the tag information derived from the patch-address.

At this point, the ROM patch is in effect and any fetch requests to the patch-address value get the patched line.

Figure 2:
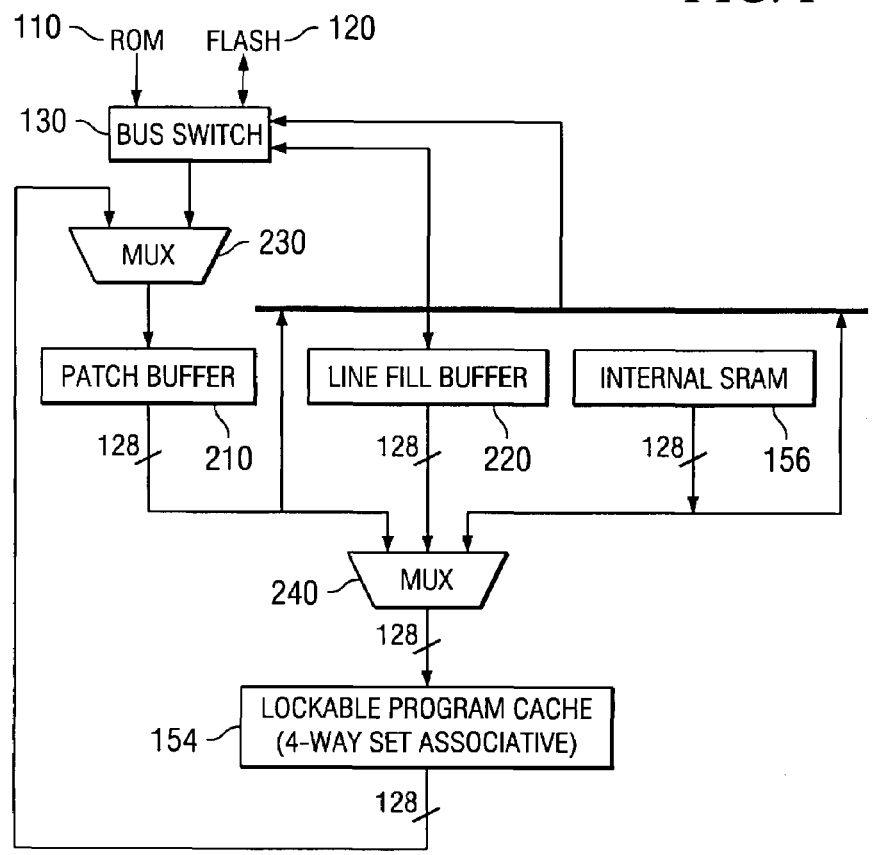
FIG. 2 illustrates in greater detail the memory subsystem extension (MSX) and other selected portions of the exemplary processing system according to one embodiment of the present invention.

FIG. 2 illustrates in greater detail memory subsystem extension (MSX) 150 and other selected portions of exemplary processing system 100 according to one embodiment of the present invention. The illustrated portions of processing system 100 comprise bus switch 130, lockable program cache 154, internal static random access memory (SRAM) 156, patch buffer 210, line fill buffer 220, multiplexer (MUX) 230, and multiplexer (MUX) 240. In the exemplary embodiment, lockable program cache 154, internal SRAM 156, patch buffer 210, and line fill buffer 220 are all 128 bits wide. In alternate embodiments, other cache line widths may be used.

Patch buffer 210 is 128 bits wide and can hold four (4) 32-bit instructions, corresponding to the program cache line. A first input channel of MUX 230 loads patch buffer 210 from lockable program cache 154 and a second input channel of MUX 230 loads patch buffer 210 from ROM 110, Flash 120, or main memory 180 via bus switch 130. A first input channel of MUX 240 loads lockable program cache 154 from patch buffer 210, a second input channel of MUX 240 loads lockable program cache 154 from line fill buffer 220, and a third input channel of MUX 240 loads lockable program cache 154 from internal SRAM 156.

Processor core logic 160 implements an instruction PTOUCHL<P3>, where P3 refers to the 32-bit address register P3 that holds the address to be used for a locked line fill sequence. Since the cache line is 128 bits (or 4 words), three of the four least significant bits, P3[3:1], are encoded to indicate the number of 128 bit lines to be pre-fetched and locked and the least significant bit, P3[0], indicate the data source is patch buffer 210 when set and line fill buffer 220 otherwise.

FIG. 3 illustrates patch table 300 used by the exemplary ROM patching apparatus according to one embodiment of the present invention. Patch table 300 comprises N entries, where each entry contains two 32-bit elements. The first element of each entry is the Patch Address, which refers to the address of the program that needs to be patched. The second element is the New Instruction, which refers to the new instruction that needs to be placed at the Patch Address. In FIG. 3, four exemplary entries are shown.

The software executed by processor core logic 160 assumes that Patch Table 300 exists and addresses it using the values patchTable, patchAddress, and newinstruction. The software also assumes that patch buffer 210 exists and addresses it using the value patchBuffer as four consecutive 32-bit words denoted as patchbuffer[0], patchBuffer[1], patchBuffer[2], patchBuffer[3], respectively.

FIG. 4 depicts flow diagram 400, which illustrates the operation of the exemplary ROM patching apparatus according to one embodiment of the present invention. For the first entry in Patch Table 300, the patch program executed by processor core logic 160 forms a patchLineAddress (PLA) value using patchAddress [31:4]from Patch Address 1 (process step 405. In particular, patchLineAddress is formed by concatenating element patchAddress [31:4], the 28 most significant bits of the first entry with four zero bits [0000]in the four least significant bits.

Next, the patch program retrieves (reads) four 32-bit words from addresses PLA, PLA+4, PLA+8,and PLA+12 in ROM and stores the retrieved bits in patchbuffer[0], patch-buffer[1], patchbuffer[2] and patchbuffer[3], respectively (process step 41). The patch program then stores the newInstruction value from New Instruction 1 in the first entry in Patch Table 300 and stores newInstruction value into patch-buffer[patchindex], where patchindex is equal to patchaddress [3:2] (process step 415). This may be done using the following substeps:

1) Read the element "newInstruction" of the entry into the variable "temp";

2) Let "patchIndex=patchAddress [3:2]", the 32-bit word that is to be patched; and 3) Store variable "temp" in patchBuffer[patchIndex], thereby forming the patched line in patch buffer 210.

Next, the patch program flushes all pending stores (process step 420). The patch program then issues a PTOUCHL <P3> instruction using the address corresponding to the PLA value and the source as patch buffer 210 (process step 425). This locks the patched line in lockable program cache 154. Finally, the patch program repeats the previous steps for the remaining entries in Patch Table 300 (Drocess sten 430).

Exemplary Software Sequence for Implementing a ROM patch:

The following is an exemplary initialization routine for ROM patch. It is assumed that MSX 150 contains a patch buffer mapped to the internal program memory space and that the patch table contains in each line the patch address and the new instruction (structure patchTable).

```
struct patchTable {
    u32 patchAddress;      // address to patch
    u32 newInst;           // new instruction to be stored at the
                           // patchAddress
};
patchTable patchArray [N];    // N Entries of patchTable lives in
FLASH
void doPatch( )
{
    u32 *addr;
    u32 *lineAddr;
    int i, j;
    for (i=0; i<N; i++) {        // Array of patch Vectors
        addr = patchArray[i].patchAddress;
        inst = patchArray[i].newInst;
        lineAddr = (addr & ~0xF);
        patchLineBuffer[0] = lineAddr[0];
        patchLineBuffer[1] = lineAddr[1];
        patchLineBuffer[2] = lineAddr[2];
        patchLineBuffer[3] = lineAddr[3];
        j = (addr >> 2) & 0x3;  // The 32-bit word to be patched
        patchLineBuffer[j] = inst;
        barrier( );             // Barrier instruction to flush the stores
        ptouchl (lineAddr, REMAP);   // Prefetch the Line with the
                                     // linefill source as patchLineBuffer
    }
}
```

The present invention has the following advantages over other ROM patch schemes. There is no requirement for an expensive content addressable memory (CAM). Also, the present invention fully exploits the existing structures and the control for lockable cache lines. Moreover, the number of patchable ROM lines is dictated by the size of the cache. For most applications, this should be sufficient. Furthermore, a very simple software sequence performs the ROM patch. Finally, the present invention supports setting of software breakpoints on ROM patched addresses and ROM addresses.

The present invention solves problems associated with setting software breakpoints on ROM patched lines, thereby allowing software breakpoints to be set on ROM addresses and ROM patched addresses. This is accomplished in the following manner:

1) Perform a PINV<breakpoint-address>. This instruction invalidates the breakpoint-address line from the cache and also writes the invalidated line onto patch buffer 210 recording the lockability status;

2) The value in patch buffer 210 is saved away into the local heap of the debugger;

3) The value in patch buffer 210 is modified to insert the software breakpoint instruction; and 4) A PTOUCH or PTOUCHL (depending on lockability status of the invalidated line) is performed with the source of the pre-fetch line being patch buffer 210. This brings the modified line into lockable program cache 154 and the breakpoint takes effect when the instruction is executed.

Although the present invention has been described in detail, those skilled in the art should understand that they can make various changes, substitutions and alterations herein without departing from the spirit and scope of the invention in its broadest form.

What is claimed is:

1. For use in a data processing system capable of executing instruction code in a read-only memory (ROM), a ROM patching apparatus for patching code in said ROM comprising:
a patch buffer capable of storing a first replacement cache line containing a first new instruction suitable for replacing at least a portion of said code in said ROM;
a lockable cache; and
core processor logic operable to read from an associated memory a patch table containing a first table entry, said first table entry containing 1) said first new instruction and 2) a first patch address identifying a first patched ROM address of said at least a portion of said code in said ROM, wherein said core processor logic is operable to load said first new instruction from said patch table into said patch buffer, to store said first replacement cache line from said patch buffer into said lockable cache, and to lock said first replacement cache line into said lockable cache to prevent the first replacement cache line from being evicted from the lockable cache;
wherein the core processor logic is further operable to set a breakpoint associated with at least one of: a ROM address and a patched ROM address by inserting a breakpoint instruction in the lockable cache.

2. The ROM patching apparatus as set forth in claim 1 wherein a subsequent access to said first patched ROM address accesses said first replacement cache line in said lockable cache.

3. The ROM patching apparatus as set forth in claim 2 wherein said core processor logic stores said first replacement cache line from said patch buffer into a lockable cache line using a special purpose pre-fetch instruction.

4. The ROM patching apparatus as set forth in claim 3 wherein said special purpose pre-fetch instruction performs a line fill of said lockable cache using said first replacement cache line in said patch buffer as a data source.

5. The ROM patching apparatus as set forth in claim 4 wherein said special purpose pre-fetch instruction stores said first replacement cache line as a locked line in said lockable cache.

6. The ROM patching apparatus as set forth in claim 5 wherein tag information associated with said first replacement cache line in said lockable cache is derived from said first patch address.

7. The ROM patching apparatus as set forth in claim 1 wherein said associated memory is a Flash coupled to said data processing system.

8. The ROM patching apparatus as set forth in claim 7 wherein said patch table contains a second table entry containing 1) a second new instruction and 2) a second patch address identifying a second patched ROM address of said at least a portion of said code in said ROM, wherein said core processor logic is operable to load a second new instruction from said patch table into said patch buffer, to store a second replacement cache line from said patch buffer into said lockable cache, and to lock said second replacement cache line into said lockable cache.

9. A data processing system comprising:
a read-only memory (ROM) for storing instructions;
a main memory for storing instructions;
an external memory for storing instructions, including patch code for said ROM;
core processor logic capable of executing said instructions stored in said ROM, said main memory and said external memory; and
a ROM patching apparatus for patching code in said ROM comprising:
a patch buffer capable of storing a first replacement cache line containing a first new instruction suitable for replacing at least a portion of said code in said ROM; and
a lockable cache,
wherein said core processor logic is operable to read from said external memory a patch table containing a first table entry, said first table entry containing 1) said first new instruction and 2) a first patch address identifying a first patched ROM address of said at least a portion of said code in said ROM, wherein said core processor logic is further operable to load said first new instruction from said patch table into said patch buffer, to store said first replacement cache line from said patch buffer into said lockable cache, and to lock said first replacement cache line into said lockable cache to prevent the first replacement cache line from being evicted from the lockable cache; and
wherein the core processor logic is further operable to set a breakpoint associated with at least one of: a ROM address and a patched ROM address by inserting a breakpoint instruction in the lockable cache.

10. The data processing system as set forth in claim 9 wherein a subsequent access to said first patched ROM address accesses said first replacement cache line in said lockable cache.

11. The data processing system as set forth in claim 10 wherein said core processor logic stores said first replacement cache line from said patch buffer into a lockable cache line using a special purpose pre-fetch instruction.

12. The data processing system as set forth in claim 11 wherein said special purpose pre-fetch instruction performs a line fill of said lockable cache using said first replacement cache line in said patch buffer as a data source.

13. The data processing system as set forth in claim 12 wherein said special purpose pre-fetch instruction stores said first replacement cache line as a locked line in said lockable cache.

14. The data processing system as set forth in claim 13 wherein tag information associated with said first replacement cache line in said lockable cache is derived from said first patch address.

15. The data processing system as set forth in claim 9 wherein said external memory is a Flash coupled to said data processing system.

16. The data processing system as set forth in claim 15 wherein said patch table contains a second table entry containing 1) a second new instruction and 2) a second patch address identifying a second patched ROM address of said at least a portion of said code in said ROM, wherein said core processor logic is operable to load a second new instruction from said patch table into said patch buffer, to store a second replacement cache line from said patch buffer into said lockable cache, and to lock said second replacement cache line into said lockable cache.

17. For use in a data processing system capable of executing instruction code in a read-only memory (ROM), a method of patching code in the ROM comprising:

reading from an associated memory a patch table containing a first table entry, the first table entry containing: 1) a first new instruction suitable for replacing at least a portion of the code in the ROM; and 2) a first patch address identifying a first patched ROM address of the at least a portion of the code in the ROM;

loading the first new instruction from the patch table into a patch buffer to thereby form a first replacement cache line;

storing the first replacement cache line from the patch buffer into the lockable cache;

locking the first replacement cache line into the lockable cache to prevent the first replacement cache line from being evicted from the lockable cache; and setting a breakpoint associated with at least one of: a ROM address and a patched ROM address by inserting a breakpoint instruction in the lockable cache.

18. The method of patching code as set forth in claim 17 wherein a subsequent access to the first patched ROM address accesses the first replacement cache line in the lockable cache.

19. The method of patching code as set forth in claim 18 wherein the step of storing the first replacement cache line from the patch buffer into the lockable cache uses a special purpose pre-fetch instruction.

20. The method of patching code as set forth in claim 19 wherein the special purpose pre-fetch instruction performs a line fill of the lockable cache using the first replacement cache line in the patch buffer as a data source.

21. The method of patching code as set forth in claim 20 wherein the special purpose pre-fetch instruction stores the first replacement cache line as a locked line in the lockable cache.

22. The method of claim 17,wherein setting the breakpoint comprises:

invalidating a line from the lockable cache;

writing the invalidated line into the patch buffer;

saving at least part of the invalidated line;

modifying the invalidated line in the patch buffer to insert the breakpoint instruction; and storing the modified line in the lockable cache to bring the breakpoint instruction into the lockable cache so that the breakpoint takes effect when the breakpoint instruction is executed.

23. The method of claim 22,further comprising:

invalidating the line from the lockable cache containing the breakpoint instruction; and restoring at least the part of the saved invalidated line.

* * * * *